July 7, 1925.  
J. A. HARLAN ET AL  
1,545,423  
ELECTRICAL APPARATUS  
Filed March 31, 1923 5 Sheets-Sheet 1

Witnesses  
Inventors  
Joseph Allen Harlan  
and Frank F. Starr  
By J. Ralph Fiehr  
Their Attorney July 7, 1925.

J. A. HARLAN ET AL 1,545,423

ELECTRICAL APPARATUS

Filed March 31, 1923      5 Sheets-Sheet 4

Witnesses
Warren Schmieding
Lloyd M. Keigley

Inventors
Joseph Allen Harlan
and Frank F. Starr
By J. Ralph Fehr
Their Attorney

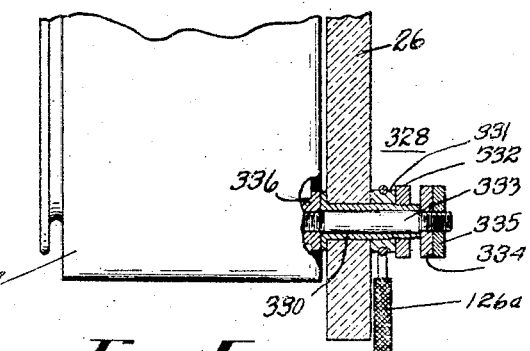
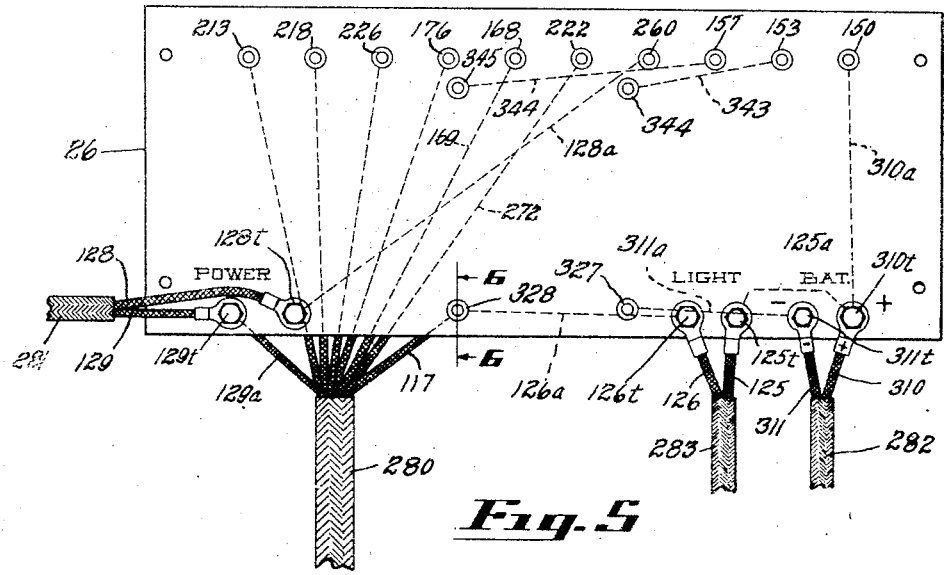

Patented July 7, 1925.

1,545,423

UNITED STATES PATENT OFFICE.

JOSEPH ALLEN HARLAN AND FRANK F. STARR, OF DAYTON, OHIO, ASSIGNORS TO DELCO-LIGHT COMPANY, OF DAYTON, OHIO, A CORPORATION OF DELAWARE.

ELECTRICAL APPARATUS.

Application filed March 31, 1923. Serial No. 629,108.

*To all whom it may concern:*

Be it known that we, JOSEPH ALLEN HARLAN and FRANK F. STARR, citizens of the United States of America, residing at Dayton, county of Montgomery, State of Ohio, have invented certain new and useful Improvements in Electrical Apparatus, of which the following is a full, clear, and exact description.

This invention relates to systems of electrical generation and battery charging, and particularly to that type of system in which a generator is driven by an engine for producing electrical current for supplying a work circuit such as a power circuit including motors or a storage battery circuit.

It is among the objects of the present invention to provide an electrical generating system, the starting or stopping of which is controlled manually, or automatically in response to some demand for current by a work circuit. In this connection it is a further object of the invention to provide manually operable mechanism for starting the plant, automatic means for starting the plant in response to a certain current demand, and means for selecting either the manual means or the automatic means for plant control.

Such a system of control requires the use of a relatively large number of electrical connections including the terminals of the different instrumentalities and connecting wires. It is not generally practical to transport the system with all its parts in assembled relation, consequently it is an aim of the present invention to so construct the parts that a greater part of them may be shipped in assembled relation while other parts, generally the ones more easily broken in transportation, may be shipped detached in preferably separate packages to lessen the liability of breakage during shipment. Furthermore, it is an object to construct the parts of the system, the detached portions of the system may be assembled at the place of destination by unskilled persons with the aid of a few simple instructions without reference to a complicated wiring diagram.

Other and further objects and advantages of the present invention will be apparent from the following description of a preferred form thereof reference being made to the accompanying drawings.

In the drawings:

Fig. 5 is a plan view of the sub-panel or terminal board; and

Fig. 6 is a sectional view on line 6—6 of Fig. 5, and shows a fragment of the ampere hour meter.

Figure 1:
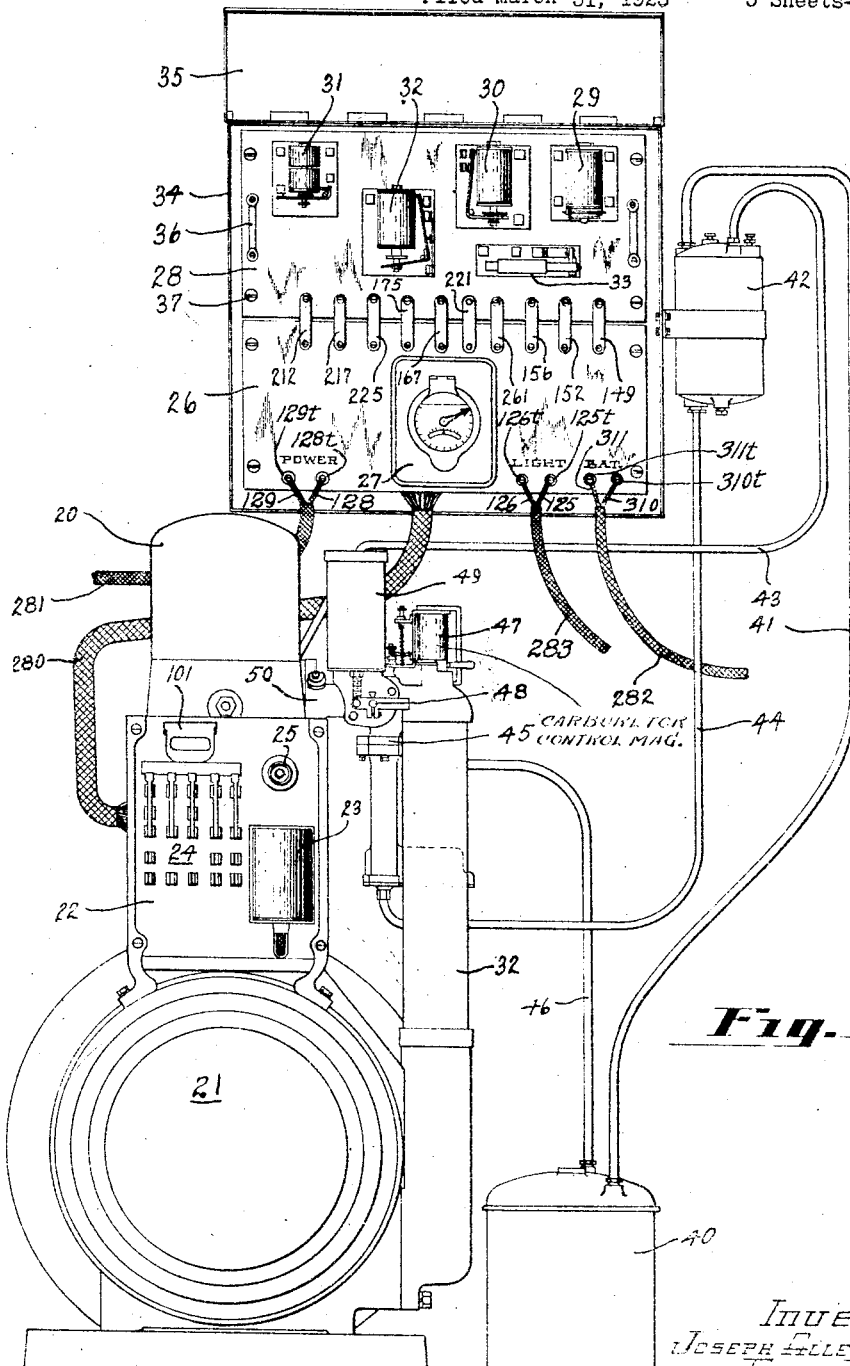
Fig. 1 is an elevation showing one end of an electrical generating plant and separate panels for supporting the manual controlling devices and the automatic controlling mechanism.

In the drawings, 20 designates an internal-combustion engine driving a generator 21, the engine and generator forming a unitary structure known as a power plant or power unit. The power unit supports a switch panel 22 on which are mounted a manually operable starting device 23 and a circuit selecting switch 24. This switch 24 is used for rendering the automatic or the manual control system operative as desired, and when this switch is placed in open position, the plant can be stopped no matter whether it has been started by manual or automatic means. The panel 22 supports also a push button operated ignition switch 25 to be used in a special way to be described. Mounted on a support independent of the power unit, the automatic controlling apparatus includes a switch panel 26 supporting an ampere-hour meter 27, and said apparatus also includes a switch panel 28 comprising a starting switch relay 29, a starting switch 30, a load switch relay 31, and a load switch 32, and a cranking cut-out 33.

The preferred method of installing the panels 26 and 28 is to mount them within a fire resisting and moisture proof box 34 having a cover 35 hinged at the top. The support for this box 34 is not shown but quite obviously it may be supported upon the wall of a room or in any other convenient manner.

The switch panel 28 is provided with handles 36 to facilitate transportation and mounting and demounting thereof with respect to the box 34 and the sub-panel 26. The wires connecting the various instruments on the panel 28 are connected to a series of terminals adjacent the lower edge of the panel, these terminals being detachably secured to a series of straps also attached to the lower panel 26. By disconnecting the straps from the terminals and by removing the screws 37, which secure the panel in position, the panel 28 may be removed for repairs in the field or may be returned to the maker for overhauling. As will be explained in detail later, the plant can be operated by the manual controller 23 in conjunction with the selecting switch 24 until the automatic controller panel 28 has been installed. This system of control contemplates providing the repair or service man with a supply of these automatic switch panels 28 so that the plant operator need not wait to have the original automatic control mechanism repaired when necessary, but an operable automatic panel can immediately be substituted and the defective panel returned to the maker or a general repair department for overhauling.

In the disclosed embodiment of this invention the engine 20 is an internal-combustion engine and is provided with fuel from a tank 40 having a fuel line 41 connected with a vacuum tank 42 of the type of vacuum tank used generally in automobile fuel feeding systems. A partial vacuum line 43 connects the engine intake with the vacuum tank 42. A fuel line 44 connects tank 42 with the engine carburetor 45 which is provided with an overflow pipe 46 in connection with fuel tank 40. The carburetor 45 is not of itself a part of the present invention but is described and claimed in the patent to Joseph A. Harlan, No. 1,491,987, issued April 29, 1924. It is sufficient to state that this carburetor includes means controlled by the electrical system for providing an initially rich mixture of fuel to facilitate engine starting. The electrical control means for this carburetor 45 includes an electromagnet 47 the terminals of which are connected with the generator to be described.

The engine throttle, the shaft of which is shown at 48 in Fig. 1, is governed by means of an electromagnet contained within a case 49, this case being mounted upon the engine intake 50.

*System of manual control.*

Figure 2:
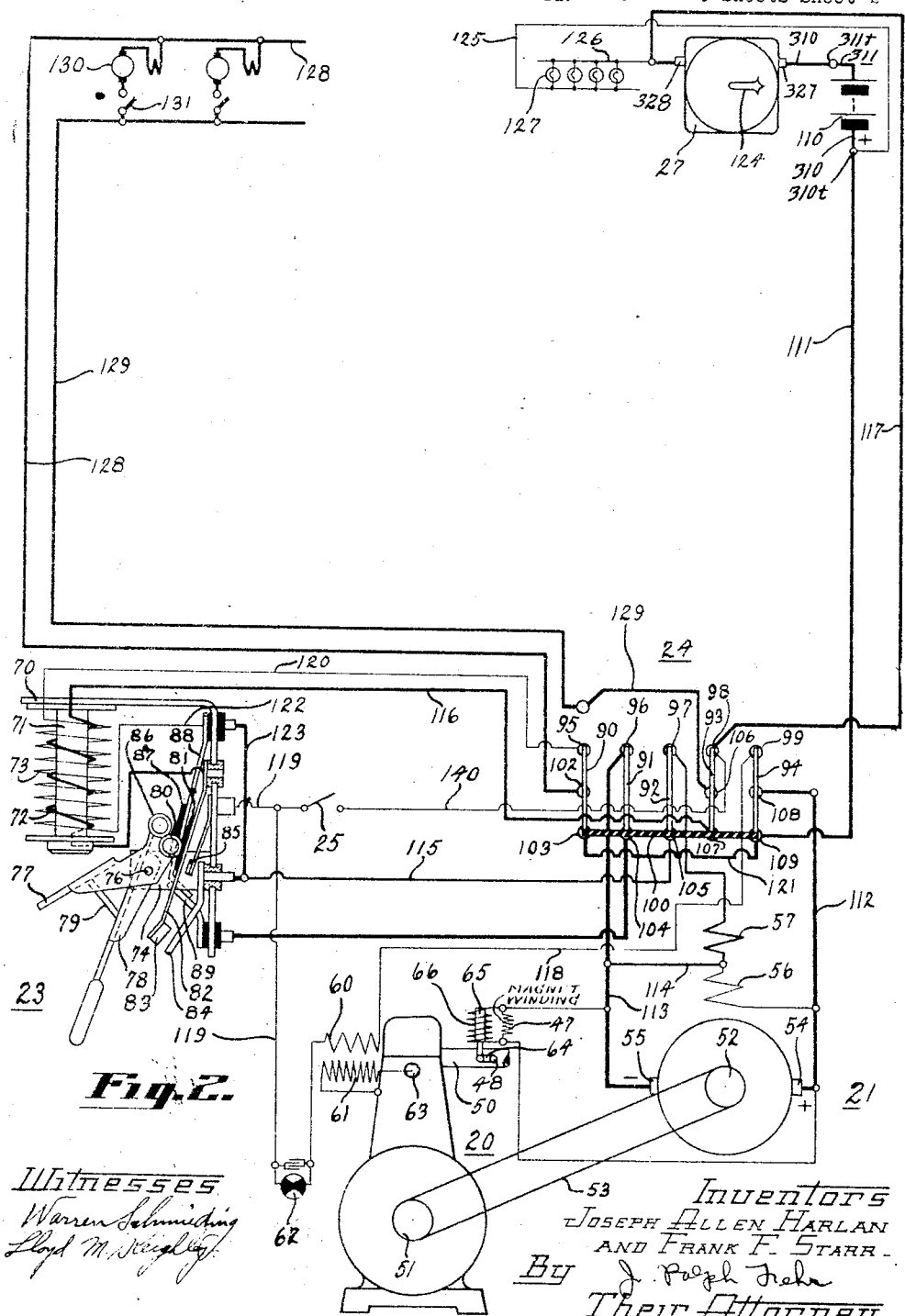
Fig. 2 is a wiring diagram of the system of manual control.

The generator 21 is preferably directly connected with the engine 20, but in Fig. 2 this mechanical connection is represented by pulleys 51 and 52 and a belt 53. The generator 21 includes brushes 54 and 55, a shunt field 56, and a series field 57.

Ignition for the engine is provided by means of an ignition coil having a primary winding 60 and a secondary winding 61, the primary being connected with a timer 62 and a source of current to be described, and the secondary being grounded and connected with a spark plug 63. As shown in Fig. 2, the throttle valve shaft 48 is connected with an arm 64 also connected with a solenoid armature 65 cooperating with a solenoid magnet 66. The electromagnets 47 and 66 are connected in shunt and both together across the generator terminals. It is apparent that the throttle magnet 66 will be responsive to generator voltage, hence the engine throttle will be governed in correspondence to some predetermined engine speed. As long as the generator 21 is in operation, the winding 47 will receive enough current to attract an armature not shown, for the purpose of controlling the engine carburetor to prevent the formation of an initially rich mixture while the engine is running.

The manually operated starting switch or controller 23 includes a frame 70 supporting a magnet core 71 which is surrounded by a coarse winding 72 and a fine winding 73. The frame 70 also supports a post 74 carrying a pin 76 upon which are pivotally mounted an armature 77 and a hand lever 78. Armature 77 when in the position shown in Fig. 2 is too far from the magnet core 71 to be attracted by it when this core is energized but armature 77 can be pushed toward the core by means of a finger 79 projecting from the lever 78. Armature 77 carries a roller 80 for engaging a non-conducting block 81 carried on a switch blade 82 having a contact 83 for engaging a contact 84. A resiliently mounted contact 85 is adapted to be engaged by the switch blade 82. Lever 78 carries a roller 86 for engaging a non-conducting block 87 carried on switch blade 88 which normally engages a contact 89.

The selecting switch 24 includes movable switch blades 90, 91, 92, 93, and 94 pivotally attached to terminals 95, 96, 97, 98, and 99, respectively. These switch blades are all connected with a non-conducting bar 100 so that the blades may be simultaneously operated by means of a handle 101 attached to the bar 100. When the bar 100 is moved downwardly into circuit making position as shown in Fig. 2, the blade 90 engages contacts 102 and 103, the blade 91 engages contact 104 and blade 92 engages contact 105, blade 93 engages contacts 106 and 107, and the blade 94 engages contacts 108 and 109.

When the selecting switch 24 is in the position shown in Fig. 2, the electrical system is in condition for plant starting by means of the starting switch 23.

To start the plant manually, the starting switch lever 78 is pulled up, that is, moved clockwise as shown in Fig. 2, causing contact 83 to engage contact 84, blade 82 to engage contact 85, and blade 88 to move away from contact 89. It is to be understood that the push button switch 25 is not manipulated and therefore is in open position. When the switch lever 78 has thus been operated, current will flow from a storage battery 110 to wire 111 to contact 109, blade 94, contact 108, wire 112, the dynamo brushes 54 and 55 connecting the armature, wire 113, wire 114, series field winding 57, contact 97, blade 92, contact 105, wire 115, contact 84, contact 83, blade 82, coarse magnet winding 72, wire 116, contact 107, blade 93, contact 98, wire 117, ampere-hour meter 27, and thence to battery 110. At the same time the shunt field winding 56 will be operated since it is connected across the line wires 112 and 114. The dynamo 21 therefore functions as a compound wound motor for cranking the engine. Ignition current for the engine will be provided since the ignition coil primary 60 and the timer 62 are provided with circuit connections to the battery in the following manner: The primary 60 is connected by wire 118 with switch contact 99 attached to blade 94 which as clearly shown is connected on the positive side of the line. The timer 62 is connected by wire 119 with blade 85 which is in contact with blade 82, a part of the negative side of the line.

At the same time the fine or shunt winding 73 of the controller 23 is receiving current from the battery since it is connected with the positive side of the line through wire 120, contact 95, blade 90, contact 103, wire 121, connected with the positive contact 109. The other end of winding 73 is connected by wire 122 and wire 123 with wire 115 on the negative side of the line. When the battery 110 discharges into the generator 21, the magnetomotive forces produced by the controller windings 72 and 73 oppose each other to prevent the armature 77 remaining in attracted position, if the lever 78 should be released. But when the engine becomes self-operative and attains a speed sufficient for the generator to charge the battery, then current through the coarse or series winding 72 will be reversed and windings 72 and 73 will assist each other in maintaining armature 77 in attracted position to maintain the battery charging and ignition circuits while permitting the lever 78 to be released. Releasing lever 78 will cause the blade 88 to reengage the contact 89, thereby short circuiting the series field winding 57, and consequently the dynamo will operate as a simple shunt wound generator.

The generator 21 when in operation supplies current for charging the battery 110, and the extent to which the battery is charged is indicated by the hand 124 of the ampere-hour meter 27. The generator also supplies current to a lighting circuit which includes line wires 125 and 126 supplying lamps 127. The generator 21 also provides current to a work or power circuit including line wires 128 and 129 for conducting current to one or more electric motors 130. This latter circuit is intended to supply current to devices such as electric motors which normally consume a great deal more current than an electric lamp. For purposes which will be described later, these devices for consuming relatively large amounts of current are all connected with this circuit. Each electric motor is provided with its own controlling switch 131. To stop the plant when the manual controller 23 is connected with the system the handle 101 of the selecting switch 24 is moved to circuit opening position thereby interrupting the engine ignition circuit and the battery charging circuit causing the plant to stop and preventing discharge from the battery to the generator. Obviously the controller 23 will return to inoperative position as shown in Fig. 2.

In case there is not sufficient current in the battery to crank the engine, it will not be necessary to operate the switch lever 78 in order to provide ignition current while hand cranking the engine. While the operator cranks the engine with one hand by means of a suitable hand crank, the other hand may be used to close the push button switch 25. When this switch is closed, ignition current will be supplied from the battery 110 by reason of a connection with timer 62 through wire 119, switch 25, wire 140, connected with switch contact 98, and by reason of the connection of primary coil 60 by wire 118 with contact 99. In case the battery 110 is too weak to supply ignition, a dry cell battery can be temporarily substituted. The engine having become self-operative, the operator will pull up on the lever 78 while still maintaining the switch 25 closed and then switch 25 can be released because the fine winding 73 of the controller 23 will maintain the armature 77 in attracted position and cause the battery still to supply current to the ignition apparatus.

It will be noted that the battery 110 may supply current to the power circuit but in order to do so the selecting switch 24 must be in the circuit making position shown in Fig. 2. Since, as already explained, the manual stopping of the plant can be effected by opening the switch 24, it naturally follows that when the plant is idle, this switch will remain open unless the plant has also the automatic control system which will be described later. But as far as the manual control system is concerned, it is quite obvious that the switch 24 will be open when the plant is idle. Therefore, before the power line can be rendered operative to receive current, the switch 24 must be closed. This feature of the system will require the presence of the operator at the switchboard and therefore at the plant itself. If power is going to be required for a short time and in very limited quantities, it may not be necessary to start the plant. The battery may be in such a state of charge that it can supply the needs of the power line. The state of charge can be read from the ampere-hour meter 27. But if the power demands are relatively heavy, the operator can then and there start the engine in operation so that the generator may supply the demands of the power circuit. Obviously it is advantageous to locate the switch 24 adjacent the switch 23. The supplying of a current demand in the power circuit requires the operation of switch 24 and the presence of the operator at the plant itself, and it is no more trouble to operate both devices 23 and 24 since they are so close together.

*Automatic plant controlling system.*

The starting switch relay 29 includes a movable armature contact 142 adapted to engage a contact 143 and having a relatively high resistance magnet winding 144 and a relatively low resistance magnet winding 145, and another relatively high resistance magnet winding 146. Either of the windings 144 or 146 will attract the armature 142 but the winding 145 is capable only of holding the armature 142 in attracted position. In the operation of the automatic system the winding 145 is not permitted to receive enough current to attract the armature 142 because as will be explained in detail later, winding 144 is initially in series with winding 145. But during the operation of the plant, winding 144 is cut out while winding 145 carries all of the current to the power circuit. Windings 145 and 146 are connected by wire 147 with a panel terminal 148 connected by a detachable strap 149 with a panel terminal 150. Winding 146 is connected with panel terminal 151 which is connected by a detachable strap 152 with panel terminal 153. Winding 144 is connected by wire 154 with a panel terminal 155 which is connected by a detachable strap 156 with panel terminal 157. The contact 143 is connected by wire 158 with the movable lever 159 of the cranking cut-out 33.

The starting switch 30 includes an armature 160 pivoted at 161 and adapted to be attracted by a magnet 162 into engagement with contacts 163 and 164. Contact 164 is connected by wire 165 with a panel terminal 166 connected by detachable strap 167 with panel terminal 168 which in turn is connected by wire 169 with wire 112. Winding 162 is connected by wire 170 with wire 154 and by wire 171 with the contact 172 of cranking cut-out 33. Wire 171 is also connected by wire 173 with panel terminal 174 which is connected by detachable strap 175 with panel terminal 176 which is connected by wire 177 with contact 178 adapted to be engaged by blade 94 of selecting switch 24.

Load switch relay 31 includes a frame 180 supporting a stationary core 181 surrounded by a relatively high resistance winding 182 having one end connected by wire 183 with wire 184 which in turn is connected with wire 170. The other end of winding 182 is connected by wire 185 with the pivot 161 of starting switch 30. The frame 180 provides a fulcrum 186 for an armature 187 which is actuated by a plunger 188 adapted to extend partly within the coil 182 when in attracted position. Plunger 188 is surrounded by a magnet winding 189 of relatively low resistance having one end thereof connected by wire 190 with panel terminal 148 and the other end thereof connected by wire 191 with contact 163 of starting switch 30. When the armature 187 is attracted as shown in Fig. 3, it will engage a contact 192 connected by wire 193 with wire 185.

The load switch 32 includes a magnet winding 200 connected with the frame 180 of relay 31 by wire 201 and connected with wire 184. This winding 200 will, when energized, attract an armature 202 pivoted at 203 and cause the armature to engage a contact 204 and a contact 205 and to cause a contact 206, carried by armature 202 but insulated therefrom, to be separated from contacts 207 and 208. When the switch 32 is idle, the contact 206 will bridge contacts 207 and 208. The armature pivot 203 is connected by wire 209 with winding 144 of the relay 29, and is connected by wire 210 with a panel terminal 211 connected by detachable strap 212 with panel terminal 213 which is connected with switch terminal 214 engageable with blade 90 of switch 24. The contact 204 is connected by wire 215 with a panel terminal 216 connected by detachable strap 217 with a panel terminal 218. Contact 207 is connected by wire 219 with a panel terminal 220 connected by detachable strap 221 with a panel terminal 222. Contact 208 is connected with a wire 223 which connects coil 200, contact 205, and wire 184 with panel terminal 224 connected by a detachable strap 225 with panel terminal 226.

Figure 3:
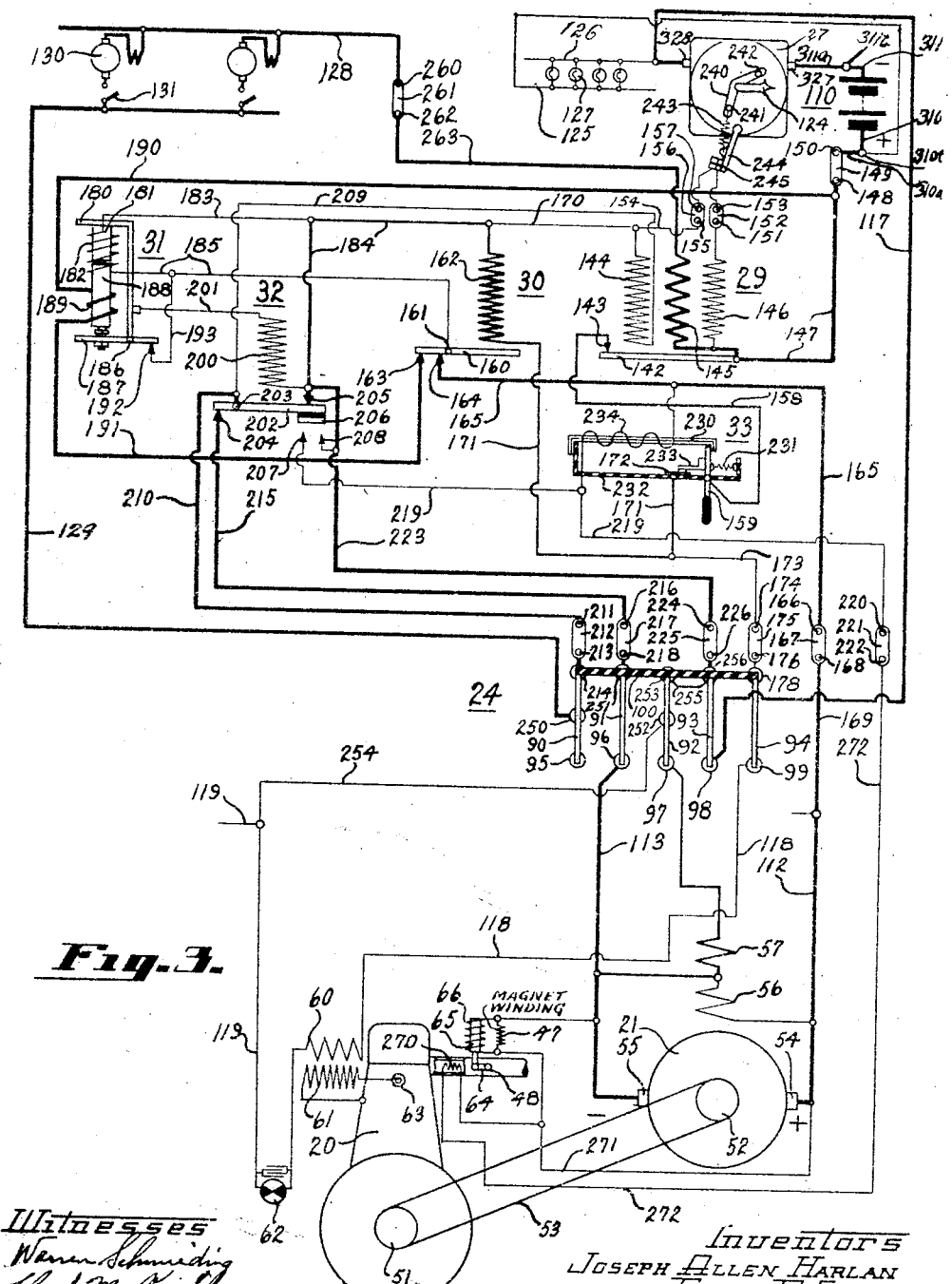
Fig. 3 is a wiring diagram of the automatic system of control.
Figure 4:
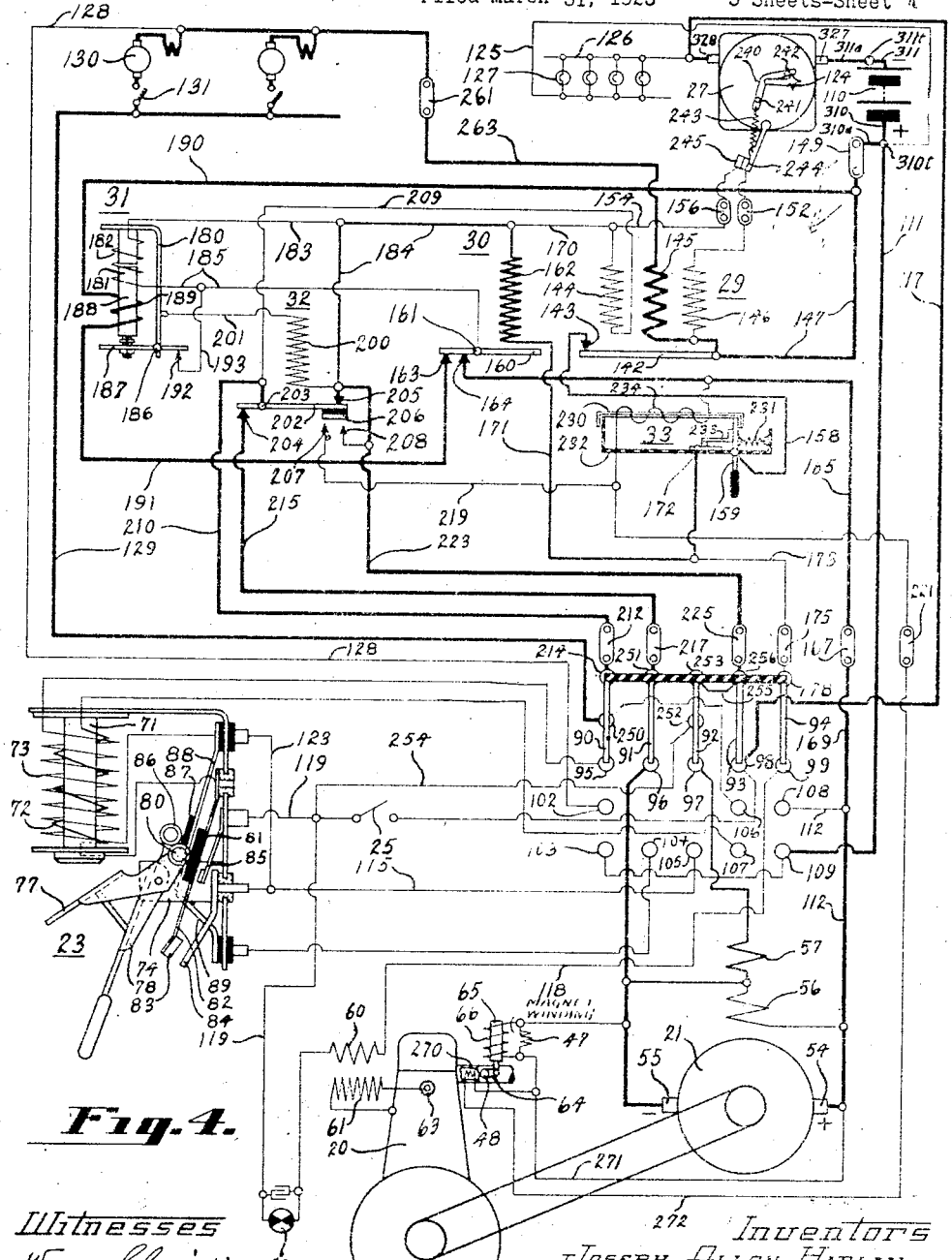
Fig. 4 is a wiring diagram of the combined manual and automatic controlling systems.

The cranking cut-out 33 includes a resilient bimetallic member 230 which serves as a latch for the lever 159 and maintains it in the position shown in Fig. 3 against the tension of a spring 231 connecting lever 159 with a non-conducting base 232. The lever 159 carries a contact 233 for engaging the contact 172. When the bimetallic member 230 is heated it will bow upwardly and release the lever 159 causing the contacts 172 and 233 to be separated. The bimetallic member 230 is heated by a coil 234 connected with wire 219 and wire 165.

The ampere-hour meter 27 is provided with a shaft not shown for turning the hand 124, and upon this shaft is pivotally mounted a lever 240 provided at its ends with studs 241 and 242 extending into the path of movement of the hand 124. Stud 241 is connected by spring 243 with a movable switch contact 244 adapted to engage a stationary contact 245. Contact 244 is connected with panel terminal 153, and contact 245 with panel terminal 157. Counter-clockwise movement of hand 124 will cause the pin 242 to be engaged thereby and cause the lever 240 to be moved until the pin 241 is moved to the right of the pivot point of lever 244 causing the spring 243 to pull the contact 244 out of engagement with contact 245. Clockwise rotation of the hand 124 would effect the return of the switch contact 244 into engagement with contact 245 as shown in Fig. 3.

The blade 90 of selecting switch 24 engages a contact 250 connected with wire 129 of the power circuit, while this contact blade 90 engages contact 214. Blade 91 engages contact 251 connected with panel terminal 218. Blade 92 engages contact 252 and 253. Contact 252 is connected by wire 254 with wire 119. Contact 253 is connected by wire 255 connected with contact 256 engaged by blade 93. Contact 256 is connected with panel terminal 226.

The power line wire 128 previously described, is connected with panel terminal 260 detachably secured to a strap 261 connected with panel terminal 262 connected by wire 263 with winding 145 of starting switch relay 29.

The intake of the engine is provided with a heating coil 270 connected with wire 271 leading to the generator brush 54 and wire 112, and the other end of coil 270 is connected by wire 272 with panel terminal 222.

*Operation of automatic controller.*

Assume that the battery has reached such a state of discharge that the hand 124 has caused the contacts 244 and 245 to be closed. The coil 146 of relay 29 will be energized by battery current through the following circuit: battery 110, connections 150, 149, 148, wire 147, coil 146, connections 151, 152, and 153, contacts 244 and 245, connections 157, 156, 155, wires 154, 184, 223, connections 224, 225, 226, contact 256, blade 93, contact 98, wire 117, ampere-hour meter 27, battery 110.

When this occurs, armature 142 will engage contact 143 and establish the following circuit to the starting switch magnet 162: battery 110, wire 147, armature 142, contact 143, wire 158, lever 159, contacts 233, 172, wire 171, magnet 162, wire 184, wire 223, contact 256, blade 93, contact 98, wire 117, ampere-hour meter 27 back to battery 110. When coil 162 is energized armature 160 will connect contacts 163 and 164 causing the following circuit to be established between the battery and dynamo for cranking the engine: battery 110, wire 190, coil 189, wire 191, contacts 163, 160, 164, wire 165, wire 169, brush 54, brush 55, series field 57, contact 97, blade 92, wire 255, from contact 253 to contact 256, blade 93, contact 98, wire 117, ampere-hour meter 27 to battery 110. The direction of current flow through coil 189 is such as to produce a magnetic field of such polarity as to repel the magnetic field produced by the winding 182 of the relay 31. This winding is energized by the closing of contacts 163, 160, and 164. Current flows from battery 110 through wire 190, coil 189, wire 191, contacts 163, 160, wire 185, coil 182, wire 183, wire 184, wire 223, contact 256, blade 93, contact 98, wire 117, ampere-hour meter 27, back to battery 110. The opposing effects produced by coils 182 and 189 cause the plunger 188 to be held in downward position so as to keep the armature 187 out of engagement with contact 192 for a purpose to be described latter.

The following ignition circuit is established by the engagement of armature 142 with contact 143 of the relay 29: battery 110, wire 147, armature 142, contact 143, wire 158, lever 159, contacts 233, 172, wire 171, wire 173, wire 177, terminal contact 178, blade 94, contact 99, wire 118, ignition primary winding 60, timer 62, wire 119, wire 254, contact 252, blade 92, wire 255, contact 256, blade 93, contact 98, wire 117, ampere-hour meter 27, battery 110. While the engine is being cranked, the following circuit is established between the battery and the heating coil 270 in the engine intake: battery 110, wire 190, winding 189, wire 191, contacts 163, 161, 164, wire 165, wire 169, wire 112, wire 271, coil 270, wire 272, wire 219, contacts 207, 206, 208, wire 223, contact 256, blade 93, contact 98, wire 117, ampere-hour meter 27, battery 110. At the same time the coil 234 of cranking cut-out 233 is connected across the line with wire 165 on the positive side and with wires 219 and 223 on the negative side. Normally the engine will become self-operative, but should it fail to start for any reason within a certain length of time, the heating coil 234 will cause the thermostat blade 230 to bow outwardly and unlatch the lever 159 causing contacts 233 and 172 to be separated thereby breaking the ignition circuit and also the circuit to the starting switch magnet 30. When this happens the cranking circuit will be broken at the contacts 163, 164, and no further discharge of the battery can take place to the generator and to the ignition system.

When the engine becomes self-operative and picks up in speed, the generator voltage rises to that of the battery voltage while the discharge of battery current through the winding 189 gradually approaches zero. While yet there is a slight battery discharge through the winding 189, the winding 182 can overcome the field of winding 189 sufficiently to attract the armature 188 and make contact between armature 187 and contact 192. When this occurs, the winding 200 of the load switch 32 will be connected across the line by means of wires 201, frame 180, armature 187, contact 192, wire 185, leading to wire 165 on the positive side of the line, the other end of coil 200 being connected with wire 223 on the negative side. When this happens, the coil 200 will move armature 202 to attracted position shown in Fig. 3 to cause contact 206 to be separated from contacts 207, 208 and to cause armature 202 to engage contacts 205 and 204. This causes the circuits to intake heating coil 270 and to the cranking cut-out heating coil 234 to be interrupted and establishes a short circuit around the series field winding 57 of the generator, and causes the characteristics of the generator to be changed instantly from that of a differential compound generator to that of a simple shunt generator and the battery charging circuit becomes as follows: generator brush 54, wire 112, wire 169, wire 165, contact 164, armature 160, contact 163, wire 191, coil 189, wire 190, battery 110, ampere-hour meter 27, wire 117, contact 98, blade 93, contact 256, wire 243, contact 205, armature 202, contact 204, wire 215, contact 251, blade 91, contact 96, wire 113, to generator brush 55. It will be observed that there has been a reversal of current through the winding 189, because the differential effect of the series field has been removed. Therefore as the engine continues further to pick up in speed, the current flow through coil 189 and on to the battery will increase. But the coil 189 is now assisting coil 182 to hold the armature 187 in elevated position as shown in the drawings. The load switch 32 also connects the power circuit with the generator by the closing of contacts 202 and 205. The power circuit is as follows: from panel terminal 148 on the positive side of the line to wire 147, starting switch relay winding 145, wire 263, connections 260, 261, 266, wire 128, wire 129, contact 250, blade 90, wire 210, armature 202, contact 204, and wire 215 connected with the negative side of the line. The connections to the power circuit are with- held until the load switch 32 functions, and it is apparent that this switch cannot function until the generator has attained a speed sufficient to overcome the battery voltage and therefore prevent the battery from discharging into the power circuit.

The battery 110 will continue to be charged until the hand 124 of the ampere-hour meter 27, in moving counterclockwise, causes the pin 242 to be moved in the same direction and therefore causes the contact 244 to be jerked open through its connection with the lever 240 by means of the spring 243. Unless current is flowing in the power circuit, there will then be no magnetism in the relay 29 to cause the armature 142 to be held in circuit making position. Obviously separation of contacts 244 and 245 will open the circuit to relay winding 146. However, if current be flowing in the power circuit for operating one of the motors 130 or other device which consumes a relatively large amount of current, the relay winding 145 will be energized sufficiently to hold the armature 142 in attracted position. Therefore the attaining of a certain state of battery charge will stop the plant automatically, in a manner to be described in detail later, provided the power circuit is not in operation, and before this state of charge is attained the turning on or off of the power circuit will not affect the operation of the plant to charge the battery provided the plant has once been put in operation automatically by virtue of a demand by the battery for a charging current. Deenergizing the relay 29 in the manner described causes armature 142 to drop away from contact 143 thereby breaking the ignition circuit and causing the engine to stop. The generator voltage diminishes below that of the battery causing a sufficient reversal of current in the winding 189 to cause this winding to overcome the winding 182 and pull the plunger 188 down thereby breaking the circuit to the load switch 32 whereupon the load circuit will be disconnected from the battery and generator, and the short circuit of the dynamo series field winding will be broken, causing the dynamo to return to its status of a compound wound machine. The separation of armature 142 from contact 143 interrupts the circuit to the starting switch magnet 162, thus allowing armature 160 to drop down and separate contacts 163 and 164, thus breaking circuit from the battery to the generator.

The starting of the plant may be effected automatically whenever there is a demand for current in the power circuit. When one of the motors 130 is to be used, the switch 131 is closed. The motor will not start to operate but the following circuit will be established by the closing of switch 131 between the winding 144 and the battery 110: battery 110, wire 147, winding 145, wire 263, wire 128, motor 130, switch 131, wire 129, contact 250, blade 90, contact 214, wire 210, wire 209, winding 144, wire 170, wire 184, wire 223, contact 256, blade 93, contact 98, wire 117, ampere-hour meter 27, battery 110. Energizing winding 144 will cause the armature 142 to be attracted and will cause the plant to start in the same manner as described in connection with the ampere-hour meter control. During the starting of the plant windings 145 and 144 are in series. 144 is a high resistance winding, therefore the discharge from the battery 110 is minimized. But when the load switch 32 operates, the winding 144 is short circuited and the full amount of current passing through the load circuit passes through the winding 145 also. It is pointed out again that the required amount of current for the power circuit is withheld by the automatic mechanism until after the generator has overcome the battery voltage and is charging the battery as well as supplying current to the power circuit. The automatic mechanism is described in further detail in the copending applications of Charles F. Kettering, Serial No. 589,992, filed Sept. 23, 1922, and of Kettering and Federle Serial No. 589,991, filed Sept. 23, 1922. In these applications certain features of the automatic mechanism herein disclosed are described and claimed.

The transportation of the electrical generating plant and the controlling apparatus of the system generally requires that the apparatus be boxed or crated. It is not generally practical to transport all of the parts of the system in assembled relation on account of the liability of breaking the more fragile parts if packed in the same container with the engine. Therefore the parts of the system have been constructed so that the heavier and less breakable parts may be shipped in assembled relation and so that the more fragile parts may be shipped separately.

To accomplish this result, the sub-panel or junction board 26 is shipped with the wires enclosed in cable 280, shown in Fig. 1 all properly connected with various terminals of the panel 26 and of the panel 22. The ampere-hour meter 27 is detachable from the panel 26 and is shipped in a separate package. Therefore the cable 280 can be wrapped around the panel 22 and the panel 26 be tied to the engine frame in any suitable manner. The instruments secured to the panel 22 are of a relatively non-breakable nature, and since the panel 22 is rigidly supported by the engine frame, the liability to damage during shipment is relatively small.

The upper panel 28 is detachable from the sub-panel 26 by virtue of the removable straps 212 etc. (see Fig. 1) connecting the lower row of terminals of panel 28 with the upper row of terminals of panel 26 and therefore the panel 28 may be conveniently shipped in a separate package in which the various instrumentalities may be protected from damage during shipment.

The parts of the system are constructed so that when these detached portions of the system which have been separately packed arrive at their destination, they may be assembled very easily by unskilled persons with the aid of a few simple instructions and without reference to a complicated wiring diagram.

To accomplish this result, the panel 26 is provided along its upper edge, as viewed in Figs. 1 and 5, with a row of terminals 213, 218, 226, 176, 168, 222, 260, 157, 153, and 150 which are located so that when the panel 26 is assembled below the panel 28, these terminals will be below the terminals 211, 216, 224, 174, 166, 220, 262, 155, 151, and 148, respectively, which are electrically related as shown in Fig. 3 and are positioned adjacent the lower edge of panel 28. The cable 280 encloses all of the wires which connect the panel 22 with other parts of the system. As shown in Fig. 5, and indicated by the wiring diagrams, wire 272 is connected with terminal 222, wire 169 is connected with terminal 168. The terminals 213, 218, 226, and 176 are connected by wires with the terminals 214, 251, 256, and 178, respectively of the switch 24. The wire 117 is connected with terminal 328 of ampere-hour meter 27. The wire 129, shown in Fig. 3, leading from terminal 250 of switch 24 to the power circuit is shown in Fig. 5 as including a wire 129 and a wire 129$^a$ connected at the panel 26 by terminal 129$^t$. The wire 128 connecting the power circuit with terminal 260 in Fig. 3 is shown in Fig. 5 as comprising wires 128 and 128$^a$ connected at a terminal 128$^t$. The light circuit wire 125 connected with battery terminal 310$^t$ in Fig. 3 is shown in Fig. 5 as comprising wires 125 and 125$^a$ connected at terminal 125$^t$. The light circuit wire 126 connected with ampere-hour meter terminal 328 in Fig. 3 is shown in Fig. 5 as comprising wires 126 and 126$^a$ connected at a terminal 126$^t$. The wires 311 and 311$^a$ constitute the connection from the negative side of the battery to the ampere-hour meter terminal 327 and are shown both in Figs. 3 and 5. The wires 310 and 310$^a$ connected at terminal 310$^t$ constitute the connection from the positive side of the battery to the terminal 150 as shown in Figs. 3 and 5. The connection between ampere-hour meter contact 244 and terminal 153, shown in Fig. 3, is provided in Fig. 5 by a terminal 344 and a wire 343 connecting with terminal 153. The connection between terminal 157 and ampere-hour meter contact 245 shown in Fig. 3, is provided by means of a terminal 345 and a wire 344 connected with terminal 157.

As previously stated the panel 26 is shipped with all of the wires enclosed by cable 280 attached to the various terminals of panels 22 and 26. The wires are $128^a$, 344, 343, $126^a$, $311^a$, $125^a$, and $310^a$ are permanently attached. The wires 128, 129, 125, and 126, 310 and 311 are not usually attached during transportation.

To install the apparatus the panels 26 and 28 are located preferably above the engine as shown in Fig. 1, and are attached by screws 37 to the back of the box 34. The attaching of these panels in position causes the lower horizontal row of terminals of the panel 28 to be vertically aligned with the upper horizontal row of terminals in panel 26. The terminals of the two panels which are to be connected are arranged in pairs in vertical alignment so that they may be easily connected by means of the straps 212, 217, etc.

Ampere-hour meter 27 is mounted upon the panel 26 before panel 26 is attached to the box 34. The mounting of the ampere-hour meter automatically provides electrical connections with its terminals 327 and 328 and with its contacts 244 and 245. This result is accomplished in the following manner: The terminals on panel 26 are substantially alike and the description terminal 328 shown in section in Fig. 6 will suffice for all. Terminal 328 includes a sleeve 330 clamped in position by means of a nut 332 which also clamps against the back of panel 26, the terminal washer 331 to which a wire may be permanently secured by soldering. One such wire is $126^a$, making connections with terminal 328. Each terminal also includes a threaded element such as a bolt or stud passing through the sleeve 330 and provided with nuts 334 and 335 for making a connection with other circuits of the system. The member 333 may be a stud attached to the frame of an instrument or it may be in the form of a bolt such as shown at $129^t$ in Fig. 5. For providing terminals for the ampere-hour meter the member 333 is a stud attached to a part 336 supported by the frame of the ampere-hour meter but insulated therefrom. The part 336 is connected with the mechanism of the ampere-hour meter by means not shown. The ampere-hour meter is provided with four such studs 333 attached adjacent the four corners of the meter and making electrical connections with the meter contacts 244 and 245 and with the electric motor measuring device. These studs 333 are all spaced so as to be aligned with the terminals 344, and 345, 327 and 328. The studs 333 are generally shipped attached to the meter so that in assembling the meter upon the panel 26 it is but necessary to move the studs simultaneously through their respective sleeves 330 and then clamp the studs in position by means of the nuts 334.

The battery is of course shipped separately and its terminals can be connected by wires 310 and 311 enclosed within a cable 282 with terminals $310^t$ and $311^t$ respectively. Wires 310 and 311 can be marked "+" and "—" respectively so that they will be connected with the battery terminals designated by the indicia "BAT" and marked "+" and "—" as shown in Fig. 5.

The light circuit terminals $125^t$ and $126^t$ can then be connected with the previously installed lead wires of the lighting system by means of the wires 125 and 126 enclosed by conduit 283.

The power circuit terminals $128^t$ and 129 are connected with the power system previously installed by wires 128 and 129 enclosed by conduit 281.

By virtue of this construction and arrangement of the controlling apparatus the automatic controller can be removed while leaving other parts of the plant and manual controller intact. By removing the connecting straps 261, 156, 152, 149, 212, 217, 225, 175, 167, and 221, from their connections with the terminals of the panel 28, and by removing the screws which secure the panel 28 to the box 34, the panel 28 may be removed as a unit for repairs or replacement. The terminal sleeves 330 to which these straps are connected are tapped to receive screws having slotted heads by means of which the straps can be conveniently attached to or removed from the panels. Until the automatic panel has been replaced in operative condition, the plant may be operated manually by moving the handle 101 of the selecting switch 24 down into its lower position for rendering operative the circuits of the manual controller 23.

It is preferable to mount the ampere-hour meter on a separate panel rather than to include it with the panel 28 carrying the instruments included in the automatic controller, because it is desirable to use the ampere-hour meter to indicate the state of battery charge at any time whether the plant be manually or automatically operated.

While the form of mechanism herein shown and described constitutes a preferred embodiment of one form of invention, it is to be understood that other forms might be adopted and various changes and alterations made in the shape, size, and proportion of the elements therein without departing from the spirit and scope of the invention.

What is claimed is as follows:

1. In an electrical system, the combination with an engine and a generator driven thereby; of a work circuit; automatic means for starting the engine in response to a demand for current by the work circuit; manually operated means for starting the engine; and means for selecting either the manual means or the automatic means for controlling the engine.

2. In an electrical system, the combination with an engine and a generator driven thereby; of a work circuit; automatic means for starting the engine in response to a demand for current by the work circuit; manually operated means for starting the engine; and means for selecting either the manual means or the automatic means for starting the engine, and for stopping the engine.

3. In an electrical system, the combination with an engine and a generator driven thereby; of a work circuit; automatic means for starting the engine and for connecting the generator with the work circuit in response to a demand for current by the work circuit; manually operated means for starting the engine and for connecting the generator with the work circuit; and means for rendering operative either the manual means or the automatic means, and for stopping the engine and disconnecting the generator from the work circuit.

4. In an electrical system, the combination with an engine and a generator driven thereby; of a work circuit; manual means for starting the engine; and automatic means for starting the engine in response to current demand by the work circuit; a portion of said means being removable from the system, the manual means remaining operative.

5. In a electrical system, the combination with an engine and a generator driven thereby; of a work circuit; manual means for starting the engine; and automatic means for starting the engine in response to current demand by the work circuit, said means including instrumentalities mounted on an instrument panel detachable from the system, the manual means remaining operative.

6. In an electrical system, the combination with an engine and a generator driven thereby; of electrical means for controlling the engine including instrumentalities mounted on a detachable panel having terminal connections with the remainder of the system which are all removable from the front of the panel.

7. In an electrical system, the combination with an engine and a generator driven thereby; of electrical means for controlling the engine including a plurality of groups of devices, a plurality of instrument panels each supporting a group of controlling devices; and means for electrically connecting one of the panels with another including connecting bars removable from the front of the panels.

8. In an electrical generating system, the combination with an engine and a generator driven thereby; of means for controlling the system including controlling devices and separate panels supporting said devices, one of said panels mounted on the engine; and means for connecting said panels including a terminal panel located adjacent the second panel, a plurality of wires connecting the first and second panels, and a plurality of connecting straps arranged in parallelism and each detachably secured to terminals on the second and third panels.

9. In an electrical generating system, the combination with an engine and a generator driven thereby; of means for controlling the system including controlling devices and separate panels supporting said devices, one of said panels mounted on the engine, a row of terminals located adjacent one edge of the second panel; means for electrically connecting said first and second panels including a terminal panel having a row of terminals adjacent one edge thereof and connected by a plurality of wires with the first panel; means for supporting the second and third panels, the said terminals of the second and third panels being spaced so that when said panels are assembled on the support the terminals which are to be respectively connected will be located opposite one another; and straps for respectively connecting the oppositely located terminals in pairs.

10. In an electrical system, the combination with an engine and a generator driven thereby; of means for manually controlling the system including a supporting panel and manually operated devices mounted therein; means for automatically controlling the plant including a panel, automatic devices mounted thereon, and a row of terminals located adjacent one edge of the panel for connecting said automatic devices with the system; and means for electrically connecting said panels including a terminal panel having a row of terminals adjacent one edge thereof and connected with the first panel; means for supporting the second and third panels, the said terminals of the second and third panels being spaced so that when said panels are assembled the terminals thereof which are to be respectively connected will be located opposite one another; and straps for respectively connecting the oppositely located terminals in pairs.

In testimony whereof we hereto affix our signatures.

JOSEPH ALLEN HARLAN.
FRANK F. STARR.

Witnesses:
MILDRED PEARE,
WARREN SCHMILDING.